(12) United States Patent
Burgunder et al.

(10) Patent No.: US 9,878,790 B2
(45) Date of Patent: Jan. 30, 2018

(54) METHOD AND DEVICE FOR FITTING OUT AN AIRCRAFT NOSE COMPARTMENT IN AN AVIONICS BAY

(71) Applicant: Airbus Operations (S.A.S.), Toulouse (FR)

(72) Inventors: Samuel Burgunder, Toulouse (FR); Bernard Guering, Montrabe (FR)

(73) Assignee: AIRBUS OPERATIONS (S.A.S.), Toulouse (FR)

(*) Notice: Subject to any disclaimer, the term of this patent is extended or adjusted under 35 U.S.C. 154(b) by 0 days.

(21) Appl. No.: 14/620,021

(22) Filed: Feb. 11, 2015

(65) Prior Publication Data

US 2015/0291281 A1    Oct. 15, 2015

Related U.S. Application Data

(63) Continuation of application No. 13/750,115, filed on Jan. 25, 2013, now abandoned, which is a (Continued)

(30) Foreign Application Priority Data

Jul. 27, 2010 (FR) ...................... 10 56141

(51) Int. Cl.
   *B64C 1/20* (2006.01)
   *B64D 11/00* (2006.01)
   (Continued)

(52) U.S. Cl.
   CPC .............. *B64D 11/00* (2013.01); *B64C 1/061* (2013.01); *B64C 1/20* (2013.01); *B64C 9/14* (2013.01);
   (Continued)

(58) Field of Classification Search
   CPC .. B64C 1/00; B64C 1/06; B64C 1/061; B64C 1/10; B64C 1/20; B64C 1/22;
   (Continued)

(56) References Cited

U.S. PATENT DOCUMENTS 1,837,186 A    12/1931    Heraclio
1,875,593 A     9/1932    Hall
(Continued)

FOREIGN PATENT DOCUMENTS

FR    2 925 462    6/2009
FR    2 933 377    1/2010
WO    WO 2012/022891    2/2012

OTHER PUBLICATIONS

French Search Report for Application No. PCT/FR2011/051795 dated Nov. 11, 2011.
(Continued)

*Primary Examiner* — Tien Q Dinh
*Assistant Examiner* — Michael A. Fabula
(74) *Attorney, Agent, or Firm* — Jenkins, Wilson, Taylor & Hunt, P.A.

(57) ABSTRACT

Method of device for installation of avionics cabinets, electrical master boxes and IFE bays includes relocating at least some of the systems cabinets toward the front of the aircraft by making use of the space available in the area around the landing gear compartment. To do so, systems cabinets are used which incorporate a structural function. The use of such system cabinet designs thus allows a reduction in the aerodynamic drag and mass of the aircraft, thereby positively impacting fuel consumption and performance of the aircraft.

16 Claims, 6 Drawing Sheets

Related U.S. Application Data continuation of application No. PCT/FR2011/051795, filed on Jul. 26, 2011.

(51) Int. Cl.
  *B64C 1/06* (2006.01)
  *B64C 9/14* (2006.01)
  *B64C 9/24* (2006.01)
  *B64C 25/02* (2006.01)

(52) U.S. Cl.
  CPC ............... *B64C 9/24* (2013.01); *B64C 25/02* (2013.01); *Y02T 50/46* (2013.01)

(58) Field of Classification Search
  CPC ......... B64C 25/02; B64C 25/04; B64D 11/00; B64D 41/00; B64D 47/00
  See application file for complete search history.

(56) References Cited

U.S. PATENT DOCUMENTS

| | | | |
|---|---|---|---|
| 2,011,902 A | 8/1935 | Guillermo | |
| 2,043,275 A | 6/1936 | Weick | |
| 2,127,864 A | 8/1938 | Rene | |
| 2,147,360 A | 2/1939 | Zaparka | |
| 2,156,403 A | 5/1939 | Henri | |
| 2,194,796 A | 3/1940 | Joyce | |
| 2,218,822 A | 10/1940 | Joyce | |
| 2,791,385 A | 5/1957 | Johnson | |
| 4,153,225 A * | 5/1979 | Paulsen | H05K 7/20572 244/118.1 |
| 5,294,080 A | 3/1994 | Ross | |
| 6,189,837 B1 | 2/2001 | Matthews | |
| 6,491,261 B1 | 12/2002 | Blake | |
| 6,565,045 B1 | 5/2003 | Correge et al. | |
| 6,843,452 B1 | 1/2005 | Vassberg et al. | |
| 6,863,245 B2 | 3/2005 | Gessler et al. | |
| 7,954,769 B2 | 6/2011 | Bushnell | |
| 2006/0108477 A1 | 5/2006 | Helou | |
| 2007/0221789 A1 | 9/2007 | Lee et al. | |
| 2009/0159743 A1 | 6/2009 | Guering | |
| 2010/0012781 A1 | 1/2010 | Cazals | |
| 2010/0187355 A1* | 7/2010 | Guering | B64D 11/00 244/118.5 |
| 2011/0127379 A1* | 6/2011 | Jager | B64C 1/18 244/118.1 |
| 2011/0272532 A1 | 11/2011 | Matsuda | |
| 2013/0228655 A1 | 9/2013 | Burgunder et al. | |
| 2013/0266444 A1 | 10/2013 | Friedel et al. | |

OTHER PUBLICATIONS

Restriction Requirement for U.S. Appl. No. 13/750,115 dated Sep. 19, 2014.
Non-Final Office Action for U.S. Appl. No. 13/750,115 dated Mar. 2, 2015.
English Translation of the Written Opinion for Application No. PCT/FR2011/051795 dated Jan. 29, 2013.

* cited by examiner

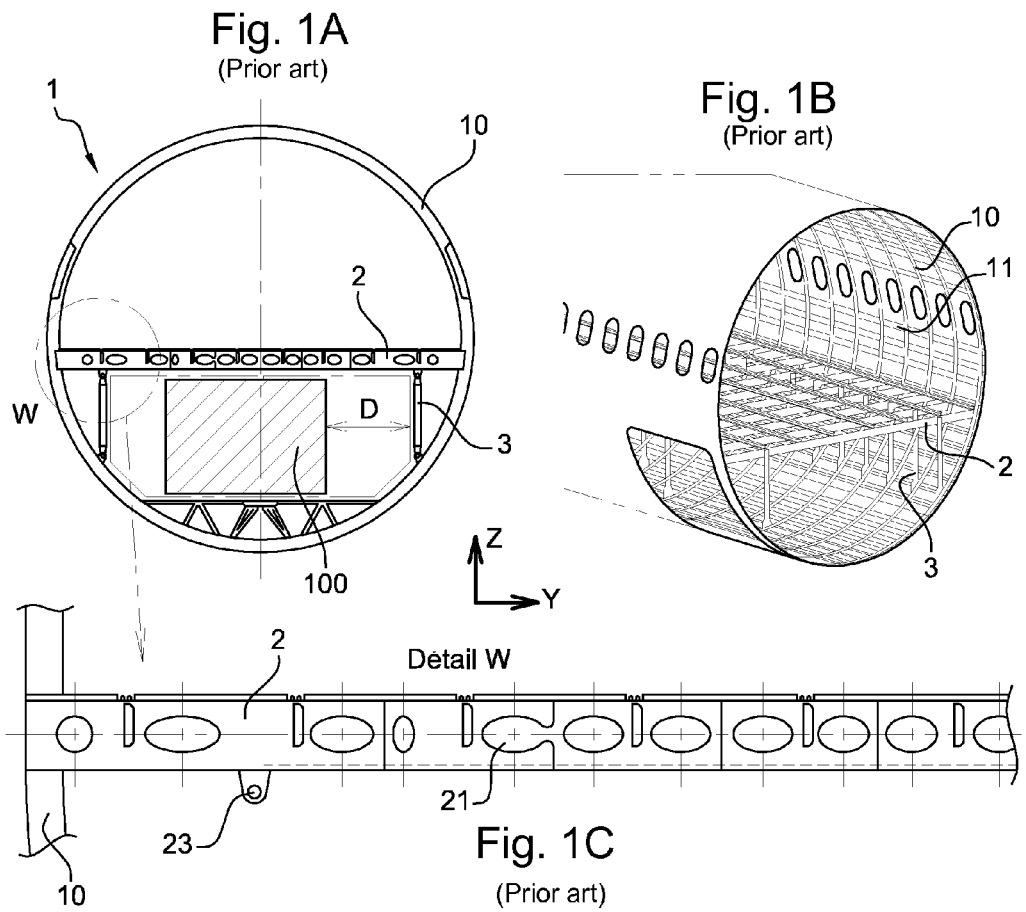
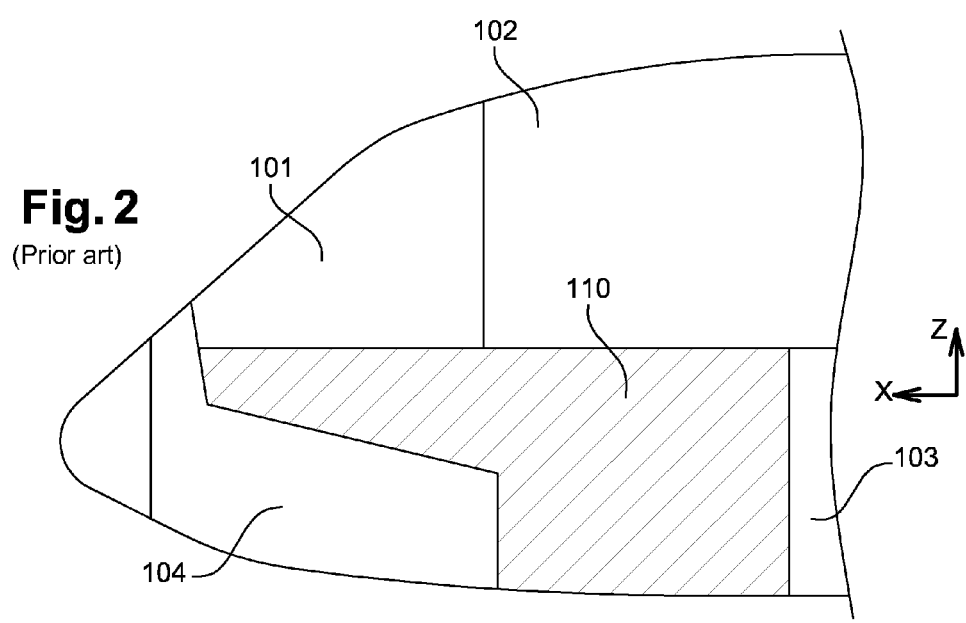

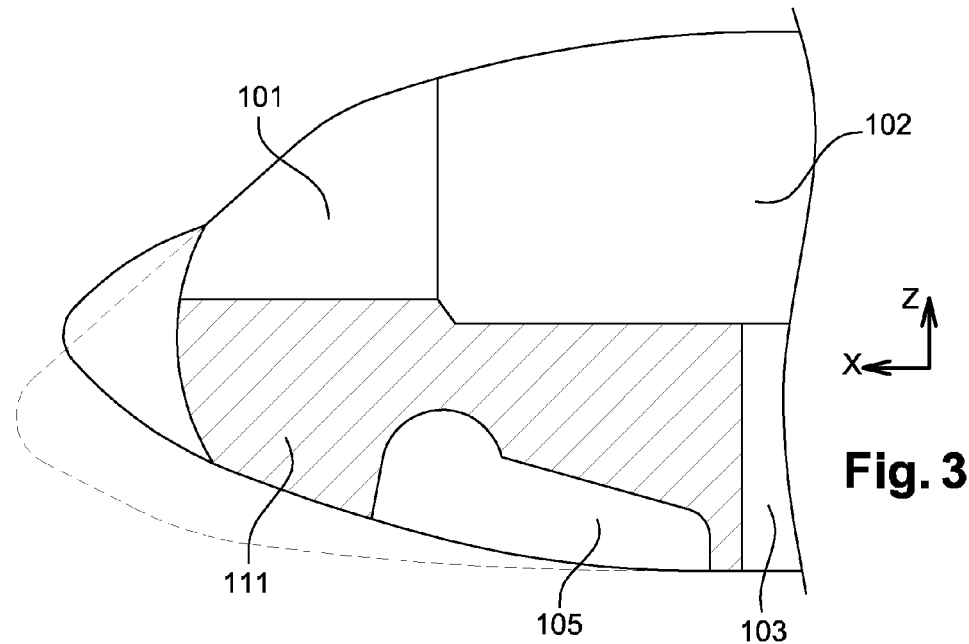
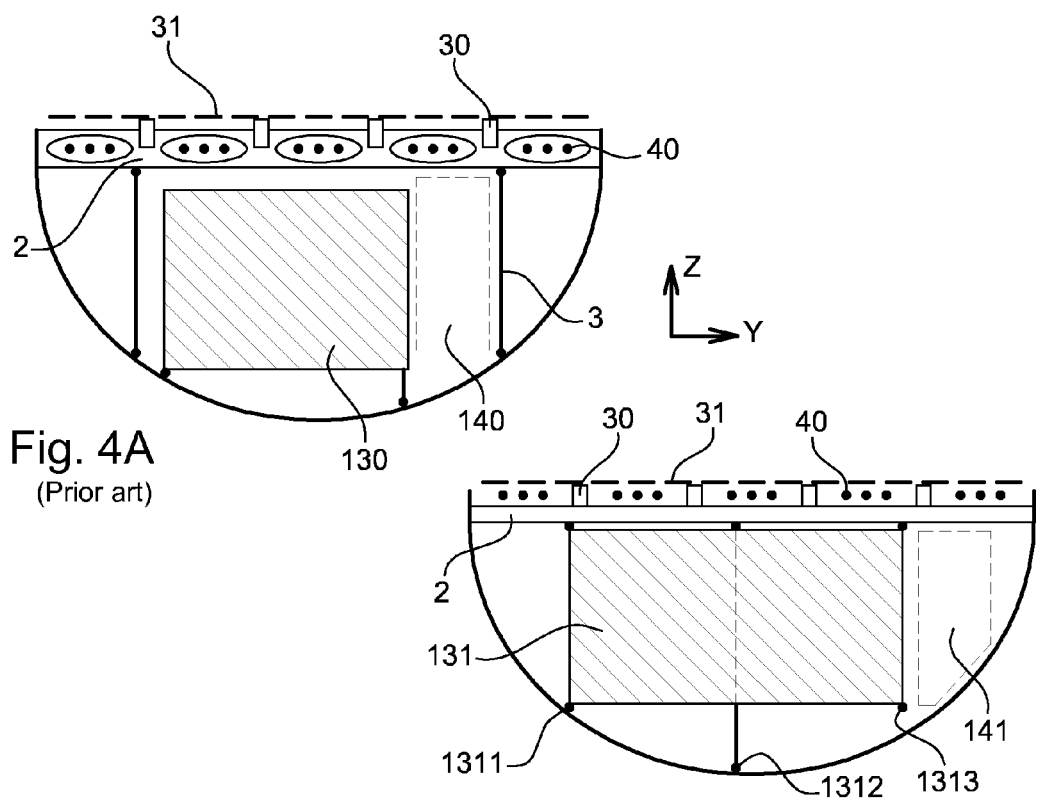

METHOD AND DEVICE FOR FITTING OUT AN AIRCRAFT NOSE COMPARTMENT IN AN AVIONICS BAY

CROSS REFERENCE TO RELATED APPLICATIONS

This application is a continuation of and claims priority to U.S. patent application Ser. No. 13/750,115, filed Jan. 25, 2013 which is a continuation of and claims priority to PCT Application No. PCT/FR2011/051795, filed Jul. 26, 2011, which claims the benefit of the filing date of French Patent Application No. FR 10 56141 filed Jul. 27, 2010, the disclosures of all of which are incorporated herein by reference.

TECHNICAL FIELD

The subject matter disclosed herein belongs to the field of aircraft systems installation. More specifically, the subject matter disclosed herein relates to the installation of avionics cabinets, electrical master boxes and IFE bays.

BACKGROUND

Commercial airplanes, more specifically high capacity transport aircrafts, comprise more and more electrical and electronic systems intended either for the aircraft's flight management and flight control, in the form of computers and control units or electrical power units, or for the comfort of passengers, such as multimedia devices, commonly referred to as IFE or "In Flight Entertainment". These systems are most often located in the front portion of the aircraft near the cockpit, generally in the bottom portion of the fuselage, under the passenger entrance and cockpit floors, in a compartment called "avionics bay".

There is redundancy for the systems essential for flight control, such that a failure cannot affect the aircraft's flight control capability. For this reason of safety, these systems must also be the subject of an electrical and mechanical segregation, between the main systems and the backup systems, so that an electrical event, such as a power surge, or a mechanical event, such as a projectile penetrating the fuselage, cannot affect the main systems and the backup systems at the same time.

The installation of these systems comprises closets, or systems cabinets, of parallelepiped shape, containing computers, electrical and electronic components generally in racks, as well as bundles of electrical cables, or harnesses, connecting these closets together, with the control unit for the cockpit or the cabin's IFE terminals. It also comprises cooling and ventilation devices for the closets. These various cabinets need to be accessible, from either the inside or the outside of the aircraft, in order to carry out component repair, replacement, inspection or maintenance operations.

According to the prior state of the art, these various systems are not installed in an area around the front landing gear compartment; there are at least two reasons for this:
- this area is potentially subject to projections, either by taxiing over objects or by a tire bursting, during taxiing or in flight;
- the area is obstructed by structural members such as struts, which limit the possibilities for installing bulky systems cabinets in this area while retaining accessibility to them.

Thus, in the face of the large increase in systems, the need to increase the volume available in the avionics bay is reflected in an expansion of the nose compartment behind the landing gear compartment. This expansion results in an increase of the aircraft's aerodynamic drag and mass. Such consequences have a direct impact on fuel consumption and therefore on the operating costs and performance of the aircraft.

SUMMARY

The subject matter disclosed herein envisages a compact installation for systems, especially in the nose compartment, so as to reduce the volume of this portion of the airplane and to reduce both the mass and the aerodynamic drag, while retaining easy access to the various system components for inspection, repair, replacement or maintenance operations. Hereinafter the general term "systems cabinet" designates an avionics cabinet, an electrical master box or an IFE bay. To meet this need, the subject matter disclosed herein proposes a systems cabinet for an aircraft comprising a fuselage forming a hull structure comprising a skin, circumferential stiffeners, called frames, placed at regular intervals along the longitudinal axis of the fuselage and cross members placed transversally and spaced one pitch apart along the longitudinal axis of the fuselage, the cross members bearing a floor, the cabinet being able to receive components in particular electronic and electrical for the operation and flight control of the aircraft, and such that this cabinet comprises a mechanical structure fastened in the aircraft's structure firstly on at least one frame (10) and secondly on at least one cross member by mountings, the mechanical structure being able to prevent the relative movements of the structural elements on which it is fastened.

The distribution pitch of cross members in the fuselage can be constant or variable, depending on the fuselage area in question.

Incorporating structural functions into the cabinet makes it possible to free up space that, according to the realizations of the prior state of the art, was occupied by structural elements such as struts whose function is to dissipate the force flows between the aircraft floor structure and the fuselage hull structure. According to the prior state of the art, these struts were mounted in the bay near the extremities of the floor cross members so as to leave room in the center of the fuselage to install various elements there. As a result the space located near the extremities was not accessible because of the presence of these struts.

Thus, the systems cabinet is installed so as to dissipate the force flows between the floor cross members and the fuselage hull structure. Incorporating structural links into the systems cabinets thus allows these supports to be distributed over the length of the floor cross members and the cross-section of the cross members to be reduced for a loading capacity equal to that of the solutions of the prior art.

The subject matter disclosed herein can be implemented according to advantageous embodiments described below, which may be considered individually or in any technically effective combination.

According to an advantageous embodiment, such a systems cabinet comprises at least 2 structural links between the cross members and the hull structure. This distribution of supports allows the cross-section of the cross members to be reduced for a structural performance equivalent to that of the prior art.

Advantageously the systems cabinet is designed for a fuselage comprising cross members distributed according to a longitudinal pitch and the width of the cabinet is a multiple of the cross members' longitudinal distribution pitch in the fuselage area where it is installed. This configuration makes it possible to simultaneously optimize the volume available inside the structural cabinet, the transversal access space between these cabinets and the distribution of the structural links.

Advantageously, the linkage for the mounting and the cross member is realized by means of a backplate resting on the surface opposite the mounting's contact surface on the cross member, a shim with an adjustable thickness being inserted between the backplate and the cross member. This feature makes it possible to ensure the effective linkage of all the cabinet's structural links with the aircraft structure through an easy adjustment. The effective dissipation of forces applied to the floor towards the aircraft's hull structure is dependent on the quality of this linkage.

Advantageously, the cabinet's structure comprises struts able to dissipate the forces in the transverse direction between the cabinet and the cross members. Thus, the struts allow the systems cabinet to be stabilized transversally while the transfer of the transverse forces applied to the systems cabinet is distributed over the length of the cross members.

The subject matter disclosed herein also relates to a method for fitting out an avionics bay in the nose compartment of an aircraft comprising a fuselage forming a hull structure and a floor laid over cross members that extend transversally in the hull structure; the method comprises:

transversally installing systems cabinets according to one of the embodiments described above, leaving a distance between two longitudinally successive cabinets at least equal to the distance between two successive cross members; and installing connection harnesses for the cabinet according to a determined path in the avionics bay.

"Installing" means:

placing and orienting the systems cabinet or the harnesses in the aircraft's structure;

fastening the systems cabinet or the harnesses to the aircraft's structure with suitable fasteners;

connecting the cabinet or the harnesses to the aircraft's control, power or multimedia distribution (IFE) network; and connecting all the cooling, ventilation, monitoring and safety systems to the cabinet.

"Transversally installing" means installing the cabinet when it is oriented in the structure such that its greatest length is parallel to the floor cross members.

As the distance between the cross members is generally sufficient for a person to pass, it is advantageous to proceed with fitting out an aircraft nose compartment avionics bay by placing systems cabinets transversally, each cabinet being separated from the next by a distance at least equal to the inter cross-member distance. This layout thus permits maximum compactness in the installation of systems cabinets in the avionics bay while retaining lateral access, through the absence of the strut, as well access between the systems cabinets.

This method is advantageously utilized for fitting out an avionics bay in a fuselage comprising cross members distributed according to a longitudinal pitch; in this case, in step a), the systems cabinets are installed transversally separated by a longitudinal distribution pitch of the cross members.

Advantageously the method comprises distributing the systems cabinets along the longitudinal axis of the aircraft according to a first group comprising the main systems cabinets and a second group comprising the backup systems cabinets. This arrangement allows the main systems and backup systems to be physically separated, so that in the case of an event such as shock or introduction of a projectile in the avionics bay, only one of the two groups can be damaged, the damaged group also serving as protection for the other group. Such events can occur if there is an explosion in the bay, by a projectile's impact on the nose or when a tire of the landing gear bursts.

Preferably, the backup systems cabinets group is installed under the aircraft's cockpit. As the cockpit is a secured area, this arrangement allows all the components linked to flight control safety to be grouped together in a single area, the area benefiting from reinforced protection. As such reinforced protection is realized at the expense of the airplane's mass, it is always advantageous to group these secured areas together so as to limit the impact on the mass. This also allows the linkages joining the cockpit to the computers and electrical master boxes to be closer and, by reducing the length of the harnesses corresponding to these connections in this way, to reduce the mass.

According to a preferred embodiment, the method comprises positioning at least one group of systems cabinets away from the trajectories followed by debris when a tire of the aircraft's front landing gear bursts.

The various linkages between the cockpit and the main or backup computers and the electrical master boxes are realized by bundles of cables commonly called "harnesses". The systems cabinet's structural function, by better distributing supports over the length of the cross members, makes it possible to use cross members with a smaller cross-section. Thus, sufficient space is provided between the floor and the cross members to allow the harnesses to pass through. Also, according to a particularly advantageous embodiment, the method of fitting out the avionics bay is such that at step b, at least one portion of the harnesses' path is between the cross members and the floor. In this way the harnesses' path is simplified and their dimensions in the avionics bay are significantly reduced.

The subject matter disclosed herein also relates to an aircraft fitted with an avionics bay designed and fitted out according to one of the embodiments of the method for fitting out the avionics bay that is the subject of the subject matter disclosed herein. This embodiment of the avionics bay makes it possible to produce a finer nose section having a smaller wetted surface while improving the accessibility of the systems in the avionics bay.

Advantageously, the aircraft comprises front landing gear that can be retracted into a landing gear compartment placed in the nose compartment, characterized in that it comprises at least one systems cabinet in the immediate vicinity of the landing gear compartment. In this way, all the space in the nose compartment is used.

Advantageously, at least one of the systems cabinets of the aircraft according to this preceding embodiment is located in the immediate vicinity of the landing gear compartment in a non-pressurized area. In this way, the peripheral space of the landing gear compartment can be used for installing non-critical systems cabinets, thus freeing space in the pressurized area of the avionics bay.

BRIEF DESCRIPTION OF THE DRAWINGS

The subject matter disclosed herein will now be described more precisely in the context of preferred non-limiting embodiments shown in FIGS. 1 to 12 in which:

FIGS. 1A-1C, relative to the prior state of the art, represents an aircraft fuselage in transversal cross-section according to a front view (FIG. 1A), a perspective front view (FIG. 1B) and according to a detail in front view (FIG. 1C);

FIG. 2, also relative to the prior state of the art, shows a portion of an aircraft nose compartment in a longitudinal lateral cross-section;

FIG. 3 shows in a longitudinal lateral cross-section a portion of an aircraft nose compartment comprising an avionics bay layout according to the subject matter disclosed herein, with a comparison of the profile of the nose compartment realized according to the prior state of the art;

FIG. 4A, relative to the prior state of the art, shows schematically in transversal front cross-section a layout of systems and systems cabinets;

FIG. 4B shows, according to the same view as FIG. 4A, a layout of systems according to an embodiment of the subject matter disclosed herein;

DETAILED DESCRIPTION

Figure 5:
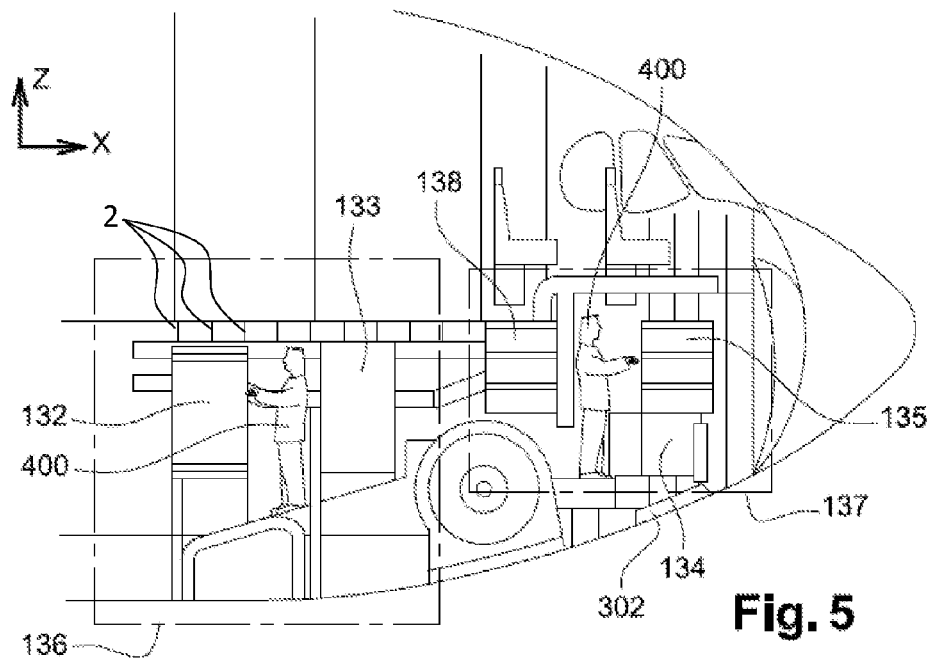
FIG. 5 shows, in a longitudinal lateral cross-section, an avionics bay layout in the nose compartment of an aircraft according to an example of realization of the subject matter disclosed herein.

FIGS. 1A-1C show a fuselage section (1) according to the prior state of the art. The fuselage structure, whether in a standard section or in the nose compartment, comprises a metallic or composite skin (11), circumferential stiffeners, called frames (10), placed at regular intervals along the longitudinal axis (X) of the fuselage defining a substantially tubular hull structure. Such a fuselage also comprises cross members (2) placed transversally and evenly distributed along the longitudinal axis of the fuselage. These cross members are intended to support the floor. They are linked to frames at each of their extremities, and are also supported by and linked to the lower portion of the fuselage by struts (3). These struts are generally linked to the cross members (2) by a pivoting linkage connection on a tenon (23). They dissipate forces between the floor and the hull structure. The cross members are pierced by openings (21) to lighten them and also to permit the passage of paths for networks such as electrical harnesses (40).

Along a cross-section of fuselage perpendicular to the latter's longitudinal axis, the interior volume allowing systems cabinets (100) to be installed must permit passages (D) to enable access to these cabinets for maintenance operations.

These systems cabinets (130) are located in a pressurized area.

FIG. 2 shows, still according to the prior state of the art, an example of the volume available in the nose compartment for an avionics bay (110) taking into account the volume taken by the landing gear compartment (104). This available volume (110) is located between the cockpit (101), the front landing gear compartment (104), the cabin space (102) and the end of the cargo compartment space (103). As a result, the only way to increase this volume is to expand it towards the cargo compartment (103), which is detrimental in terms of the volume of freight that can be transported by the airplane, or to increase the diameter of the nose compartment, which has a direct negative impact on the vehicle's aerodynamic drag.

In its general principle, the subject matter disclosed herein comprises relocating at least some of the systems cabinets toward the front of the aircraft by making use of the space available in the area around the landing gear compartment. According to the prior state of the art and the general knowledge of the person skilled in the art, this area is left free of any systems cabinet, especially if the cabinet comprises control or power units that are essential for the aircraft's flight control since this area is particularly exposed to various projections likely to damage the systems.

Figure 8:
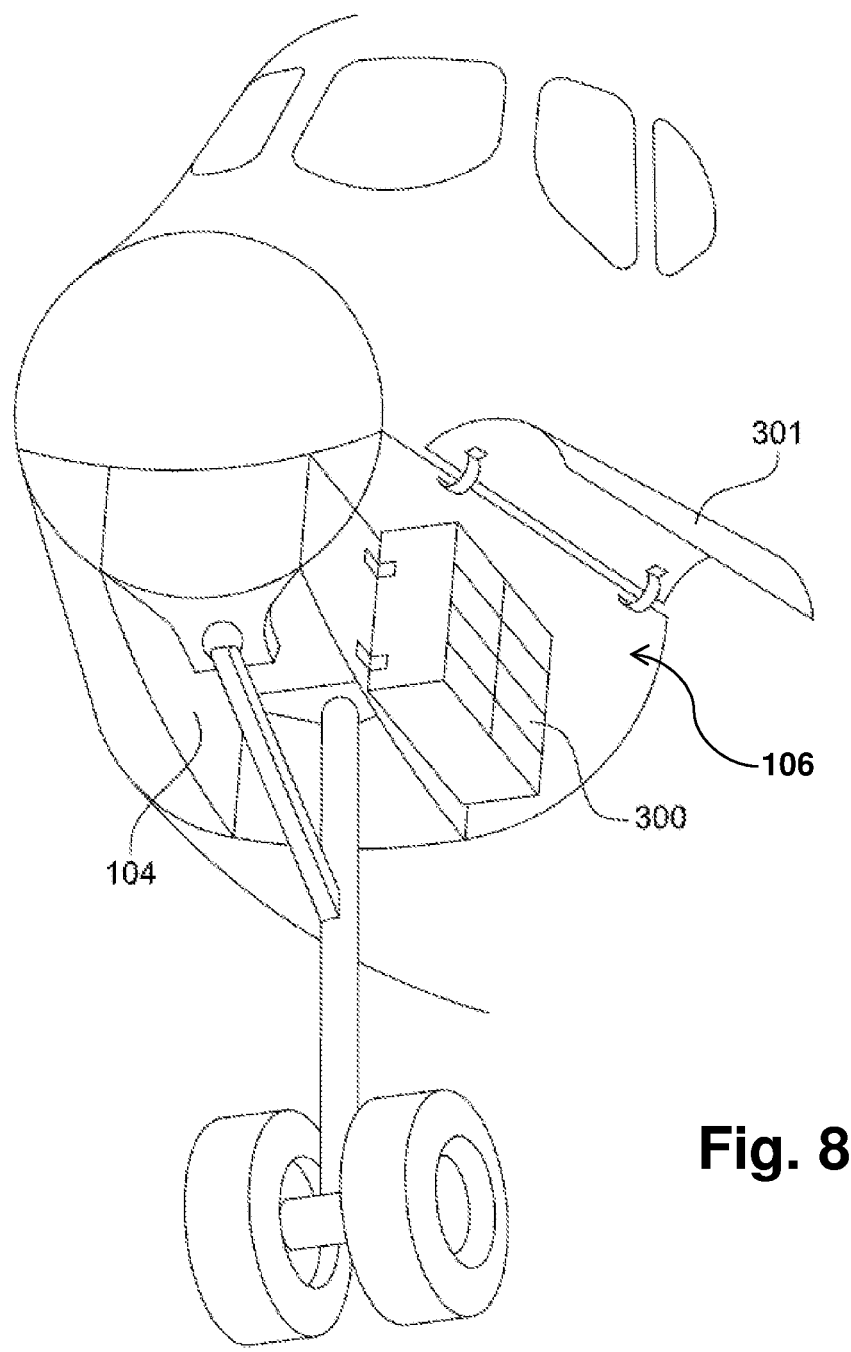
FIG. 8 represents, in perspective and from the front, a nose compartment of an aircraft comprising an IFE bay placed on the sides of the landing gear compartment.

FIG. 8: according to a first embodiment, systems cabinets (300) whose operation is not critical for the aircraft's flight control, such as the IFE bays, can be placed in a non-pressurized area (106), fastened directly onto the sides of the landing gear compartment (104). A hatch (301) enables access from outside to these IFE bays which, not being essential for the aircraft's operation, only require minimum protection with regard to impacts with foreign bodies.

FIG. 3: in order to do more it is, however, necessary to use all the space available around the landing gear compartment; to this end the subject matter disclosed herein proposes to use systems cabinets incorporating structural functions and a specific layout of the avionics bay allowing increased safety for systems in the event of a projectile's intrusion into the bay.

FIG. 3: the subject matter disclosed herein will be implemented in an even more effective way if the aircraft comprises an enveloping front landing gear compartment (105) described in French patent application FR2925462 in the name of the applicant, allowing a larger volume (111) to be freed for the avionics bay.

According to the prior state of the art, FIG. 4A, the systems cabinets (130) are linked isostatically to the aircraft structure inside a volume delimited by the struts (3). This available volume is also reduced by a passage (140) required to provide access to the systems cabinets for maintenance purposes. The electrical harnesses (40) are passed through apertures (21) in the floor cross members (2) extending along the aircraft's Y axis. As for the floor (31), it is conventionally fastened on rails (30) extending longitudinally along the aircraft's X axis, the rails themselves resting on the cross members (2).

According to an example of realization of the subject matter disclosed herein, FIG. 4B, the systems cabinets comprise structural linkage elements (1311, 1312, 1313) making it possible to dissipate the vertical forces, along Z, between the cross members (2) and the hull structure of the fuselage. Thus, struts (3) do not need to be installed where such systems cabinets are installed. In addition, this configuration makes it possible to position a structural link (1312) in the central portion of the cross member (2) and thus to utilize cross members that have a smaller cross-section and equivalent stiffness, the unsupported length subject to their bending being reduced. It is then possible to free a larger space for the passage of the electrical harnesses (40), e.g. under the floor (31), between the rails (30).

The absence of the strut (3) makes it possible to free a space (141) for access to the systems cabinets and thus install larger systems cabinets (131) in the same volume of avionics bay.

Figure 6:
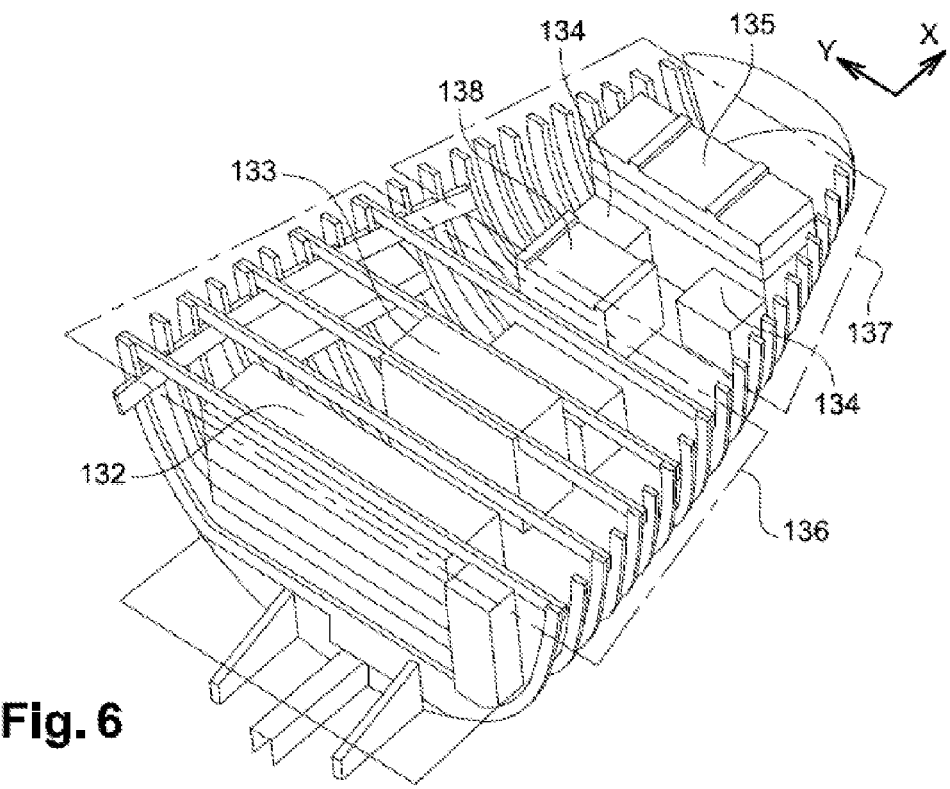
FIG. 6 presents the same nose compartment as FIG. 5, this time in a perspective longitudinal cross-section viewed from the rear.

According to an example of realization, FIGS. 5 and 6, the systems cabinets are placed transversally along the Y axis of the fuselage. Each systems cabinet can act as a structural link for one or more cross members.

This layout also allows systems cabinets to be physically segregated along the X and Z axes of the aircraft.

Thus the electrical master boxes and the avionics computers are positioned in two groups. The first group (136), located on the cargo bay side, comprises the main avionics closet (132) and the main electrical master box (133). The second group (137), located under the cockpit (101), comprises the backup avionics closet (134) and the backup electrical master box (135).

Figure 7:
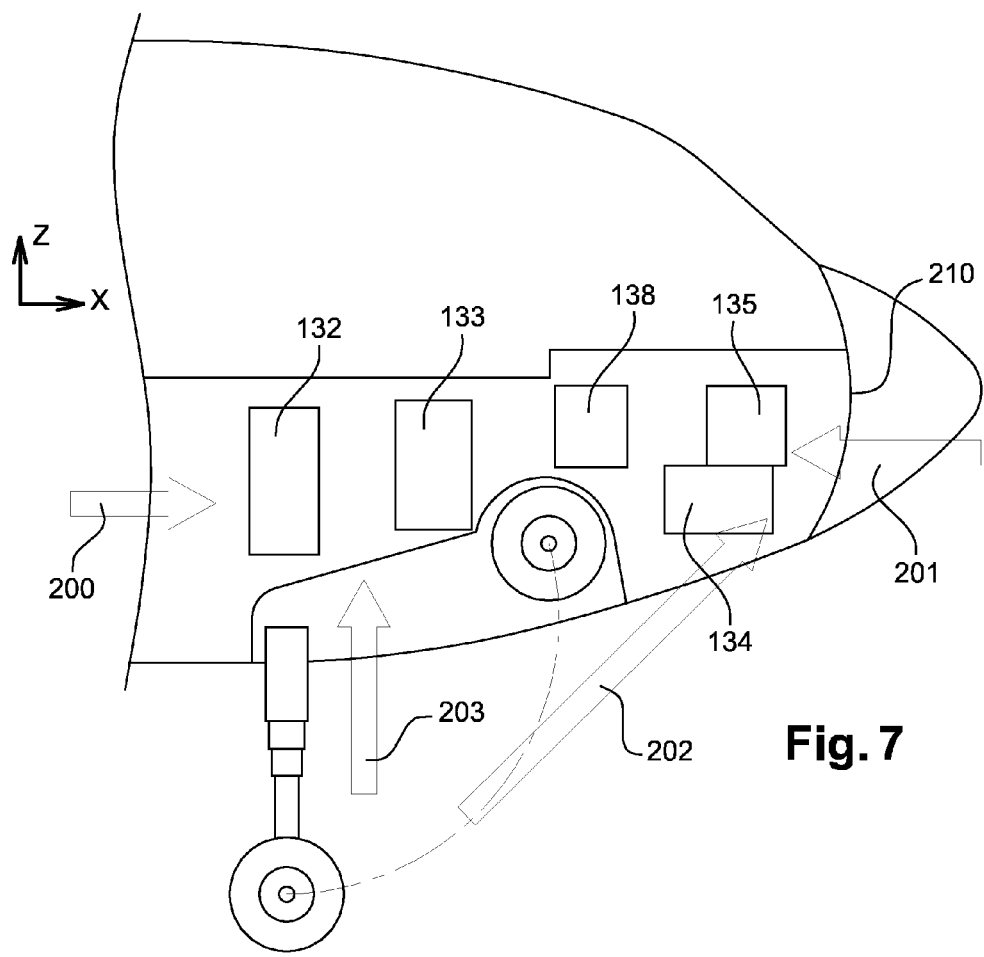
FIG. 7 represents, according to the same view as FIG. 5, a nose compartment fitted out according to an example of realization of the subject matter disclosed herein and highlighting the trajectories of the landing gear and possible projections likely to occur in this area of the aircraft.

FIG. 7: this segregation allows the systems to be protected by ensuring that an event such as a cargo bay explosion (200), a projectile's impact on the nose (201) or the impact of debris linked to a tire bursting (202, 203) cannot destroy all of the aircraft's vital flight control functions.

Thus, a cargo bay explosion could affect the main avionics closet (132) and possibly the main electrical master box (133) but there would only be a very small probability of this affecting the backup systems (134, 135). A projectile impacting at the nose (201) would first of all be slowed down by the forward shield (210), then it would affect the backup electrical master box (135) and possibly the backup avionics closet (134), sparing the main systems (132, 133). Similarly, if a tire bursts, the debris travels mainly perpendicularly to the latter's surface (202, 203). Regardless of the trajectory of this debris, it can only affect either the backup systems or the main systems. The optional systems (138) not essential for the operation or flight control of the aircraft, such as the IFE bays, can be placed above the landing gear compartment (104), an area that remains more vulnerable.

Returning to FIG. 5, this shows clearly that the transversal layout of systems cabinets, spaced at an interval of a cross member pitch, makes it possible to retain access for people (400) for maintenance operations. This access is possible via the cargo bay (103) for the first group (136) of systems cabinets and via the outside of the aircraft, by means of a hatch (302) located in front of the landing gear compartment, for the second group (137) of systems cabinets.

Figure 9A:
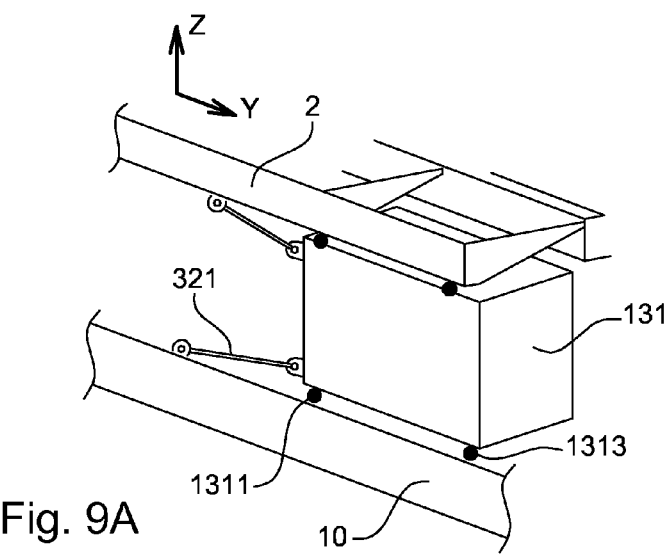
FIGS. 9A-9B illustrates an example of installation of a systems cabinet in the fuselage of an aircraft, in a front view in perspective (FIG. 9A) and in profile (FIG. 9B)
Figure 9B:
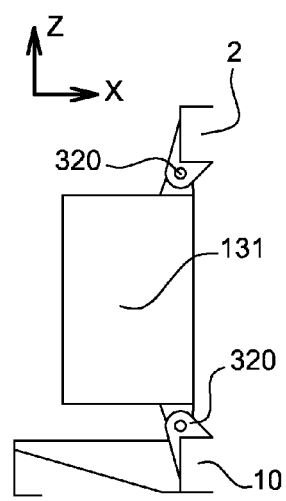

FIG. 9: according to an example of realization, the systems cabinet (131) is fastened in the aircraft's structure, firstly on at least one frame (10) and secondly on at least one cross member (2), by mountings (320) and struts (321). The mountings (320) form supports transferring the vertical forces, along Z, applied to the cross members. The struts (321) transfer the transverse forces, along Y. They thus stabilize the systems cabinet with regard to transverse accelerations.

Once installed the systems cabinet, whose structure is sized to transmit the forces, blocks vertical movements of the surrounding structure and makes it possible to eliminate the structural struts (3) of the prior state of the art. However, as a systems cabinet, it must be able to be fitted and removed without too much difficulty. To this end, the cabinet is linked in particular by a set of mountings (320) allowing an assembly able to compensate for the positioning tolerances of the cross members and the frames in the structure.

Figure 10:
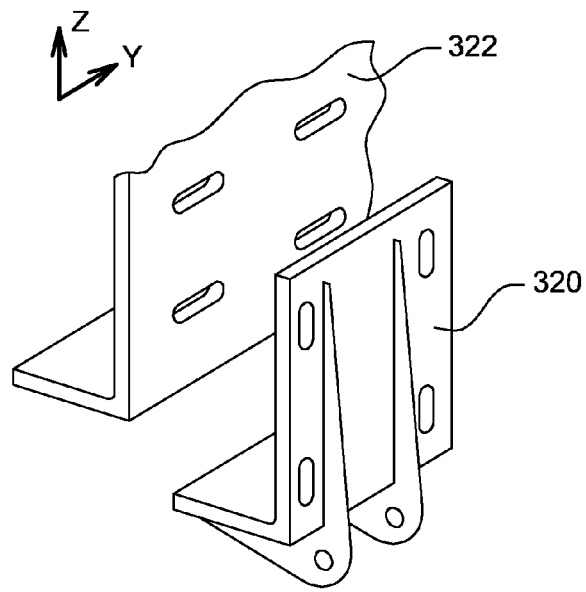
FIGS. 10 to 12 show details of an example of fastenings designed for the installation of a systems cabinet according to the subject matter disclosed herein in the fuselage of an aircraft.

FIG. 10: according to an advantageous example of realization, the mountings (320) are fastened to the cross members (2) or to the frames (10) by means of a backplate (322).

Figure 11:
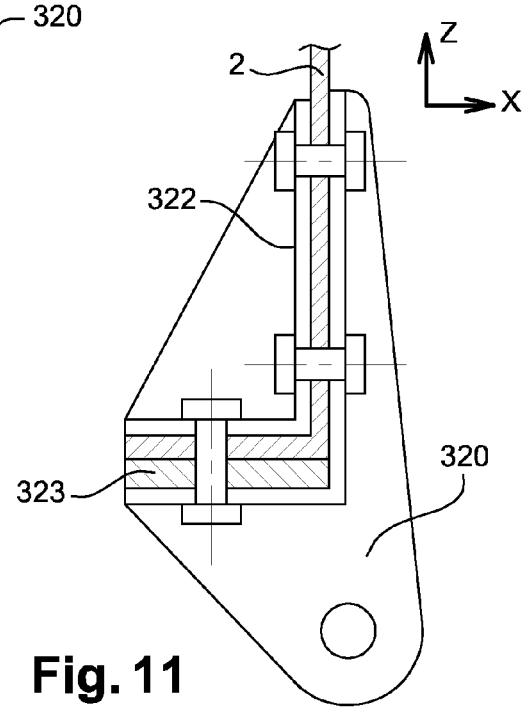

FIG. 11: according to this example of realization, the cross member (2) is held in a vice between the mounting (320) and the backplate (322). To ensure the mechanical resilience of the linkage, a compensation shim (323) with a thickness adjusted to the assembly is inserted between the mounting (320) and the cross member (2).

Figure 12:
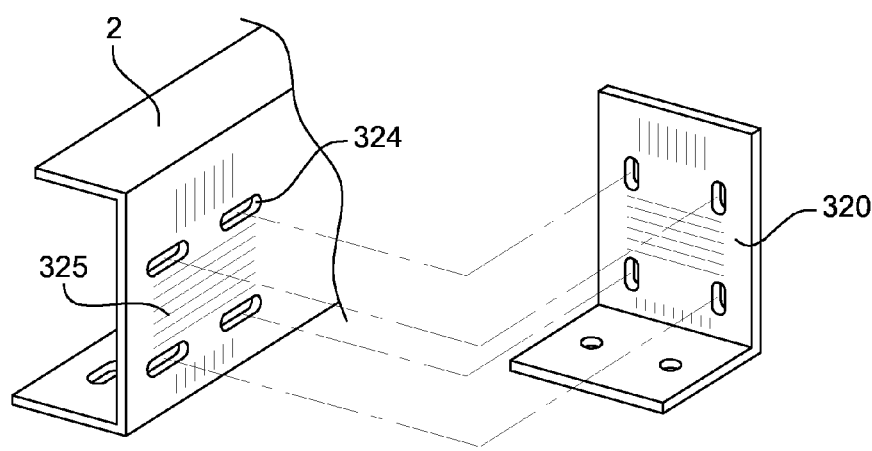

FIG. 12: Y and Z adjustment to the mounting's position on the cross member is obtained by oblong apertures (324) and serrations (325) with complementary profiles realized on the cross member (2) and on the surface on the mounting (320) that is facing the cross member (2).

The above description clearly illustrates that through its various features and their advantages the subject matter disclosed herein realizes the objectives it set itself. In particular, it makes it possible to use the volume around the landing gear compartment in the nose compartment of an aircraft to install systems cabinets and thus to reduce the aircraft's aerodynamic drag.

While at least one exemplary embodiment of the subject matter disclosed herein(s) has been shown and described, it should be understood that modifications, substitutions and alternatives may be apparent to one of ordinary skill in the art and can be made without departing from the scope of the disclosure described herein. This application is intended to cover any adaptations or variations of the specific embodiments discussed herein. In addition, in this disclosure, the terms "comprise" or "comprising" do not exclude other elements or steps, and the terms "a" or "one" do not exclude a plural number. Furthermore, characteristics or steps which have been described with reference to one of the above exemplary embodiments may also be used in combination with other characteristics or steps of other exemplary embodiments described above.

The invention claimed is:

1. A systems cabinet of an aircraft, the systems cabinet comprising:
   a cabinet which receives and/or holds components, in particular electronic and electrical components for operation and flight control of the aircraft, and
   a mechanical structure fastened by lower mountings and upper mountings in a structure of the aircraft, the lower mountings being on a circumferential stiffener of the aircraft and the upper mountings being on a cross member of the aircraft,
   wherein the systems cabinet has a front side, through which the components are accessible and/or removable,
   wherein the circumferential stiffener and the cross member to which the systems cabinet is affixed are substantially parallel to each other,
   wherein the mechanical structure is configured to provide added stiffness and rigidity to resist deflections under a loading of the circumferential stiffener and the cross member on which the mechanical structure is fastened,
   wherein all of the upper mountings of the front side of the systems cabinet are attached to a same cross member of the aircraft and all of the lower mountings of a front side of the systems cabinet are attached to a same circumferential stiffener of the aircraft, such that the systems cabinet is substantially horizontal when in an installed position,
   wherein the aircraft comprises a plurality of circumferential stiffeners, including the circumferential stiffener to which the systems cabinet is affixed, that are arranged at regular intervals along a longitudinal axis of a fuselage of the aircraft, and
   wherein the aircraft comprises a plurality of cross members, including the cross member to which the systems cabinet is affixed, that are oriented transversally and spaced apart by a longitudinal distribution pitch along a longitudinal axis of the fuselage, the plurality of cross members being configured to bear a floor of the aircraft.

2. The systems cabinet according to claim 1, comprising:
at least two upper mountings; and
at least two lower mountings,
wherein the upper and lower mountings connect the mechanical structure between the cross member and the circumferential stiffener to which the systems cabinet is affixed.

3. The systems cabinet according to claim 2, wherein a depth of the cabinet is a multiple of the longitudinal distribution pitch.

4. The systems cabinet according to claim 3, wherein each of the upper mountings comprise:
a backplate resting on a surface of the cross member, opposite a contact surface of the upper mountings on the cross member, and
a shim inserted between respective upper mountings and the cross member,
wherein the shim has a thickness adjusted to a space formed during assembly between the backplate and the cross member.

5. A systems cabinet of an aircraft, the systems cabinet comprising:
a cabinet which receives and/or holds components, in particular electronic and electrical components for operation and flight control of the aircraft, and
a mechanical structure fastened by lower mountings and upper mountings in a structure of the aircraft, the lower mountings being on a circumferential stiffener of the aircraft and the upper mountings being on a cross member of the aircraft,
wherein the systems cabinet has a front side, through which the components are accessible and/or removable,
wherein the circumferential stiffener and the cross member to which the systems cabinet is affixed are substantially parallel and to each other,
wherein the mechanical structure is configured to provide added stiffness and rigidity to resist deflections under a loading of the circumferential stiffener and the cross member on which the mechanical structure is fastened,
wherein all of the upper mountings of the front side of the systems cabinet are attached to a same cross member of the aircraft and all of the lower mountings of a front side of the systems cabinet are attached to a same circumferential stiffener of the aircraft, such that the systems cabinet is substantially horizontal when in an installed position,
wherein the aircraft comprises a plurality of circumferential stiffeners, including the circumferential stiffener to which the systems cabinet is affixed, that are arranged at regular intervals along a longitudinal axis of a fuselage of the aircraft,
wherein the aircraft comprises a plurality of cross members, including the cross member to which the systems cabinet is affixed, that are oriented transversally and spaced apart by a longitudinal distribution pitch along a longitudinal axis of the fuselage, the plurality of cross members being configured to bear a floor of the aircraft, and
wherein the mechanical structure comprises:
struts configured to dissipate forces between the cabinet and the cross member to which the systems cabinet is affixed,
wherein the forces are oriented in a transverse direction of the aircraft.

6. A method for fitting out an avionics bay in a nose compartment of an aircraft, the aircraft comprising a fuselage forming, in at least a nose compartment, a hull structure, which includes a plurality of circumferential stiffeners, and a floor laid over a plurality of cross members that extend transversally in the hull structure and are distributed in the fuselage, the method comprising:
transversally installing one or more systems cabinets according to claim 5, such that each of the one or more systems cabinets is oriented so that the front side faces in a direction parallel to a longitudinal axis of the aircraft and the one or more systems cabinets are installed side-by-side in the transverse direction of the aircraft, and
installing connection harnesses for the one or more systems cabinets according to a determined path in the avionics bay.

7. The method according to claim 6,
wherein the cross members are distributed according to the longitudinal distribution pitch,
wherein the one or more transversally installed systems cabinets comprise at least two transversally installed system cabinets that are installed in more than one row, each row being transversally oriented with respect to the longitudinal axis of the aircraft and separated by the longitudinal distribution pitch.

8. The method according to claim 7, wherein each transversally oriented row comprises one or more systems cabinets.

9. The method according to claim 6, wherein the one or more systems cabinets are at least two systems cabinets which are distributed along the longitudinal axis of the aircraft according to a first group comprising main systems cabinets and a second group comprising backup systems cabinets.

10. The method according to claim 9, wherein the second group is installed substantially underneath a cockpit of the aircraft, the cockpit being disposed within the nose compartment of the aircraft.

11. An aircraft comprising:
a nose compartment,
wherein the nose compartment comprises:
an avionics bay,
cross members oriented transversally and spaced one pitch apart along a longitudinal axis of the aircraft,
a floor laid over the cross members,
circumferential stiffeners arranged at regular intervals along a longitudinal axis of the aircraft, and
systems cabinets, each comprising:
a cabinet which receives and/or holds components, in particular electronic and electrical components for operation and flight control of the aircraft, and
a mechanical structure fastened by lower mountings and upper mountings in a structure of the aircraft, the lower mountings being on one of the circumferential stiffeners of the aircraft and the upper mountings being on one of the cross members of the aircraft,
wherein the systems cabinet has a front side, through which the components are accessible and/or removable,
wherein the mechanical structure comprises:
struts configured to dissipate forces between the cabinet and the cross members, the forces being oriented in a transverse direction of the aircraft, wherein the circumferential stiffeners and the cross members are substantially parallel to each other, wherein the mechanical structure is configured to provide added stiffness and rigidity to resist deflections under a loading of the circumferential stiffener and the cross member on which the mechanical structure is fastened, wherein the systems cabinets are installed in a transverse direction of the aircraft, such that the front side is oriented to face in a direction parallel to the longitudinal axis of the aircraft, wherein all of the upper mountings of the front side of the systems cabinet are attached to a same cross member of the aircraft and all of the lower mountings of a front side of the systems cabinet are attached to a same circumferential stiffener of the aircraft, such that the systems cabinet is substantially horizontal when in an installed position, wherein the systems cabinets are installed in more than one row, wherein each row of the more than one row is transversely oriented with respect to the longitudinal axis of the aircraft, wherein each transversally oriented row comprises one or more of the systems cabinets, and wherein connection harnesses for the systems cabinets are installed according to a determined path in the avionics bay.

12. The aircraft according to claim 11, wherein the systems cabinets are separated by a longitudinal distribution pitch of the cross members.

13. The aircraft according to claim 11, wherein the aircraft comprises front landing gear, which is retractable into a landing gear compartment disposed in the nose compartment, and wherein at least one of the systems cabinets is disposed in an immediate vicinity of the landing gear compartment.

14. The aircraft according to claim 13, comprising at least one further systems cabinet fastened onto a side of the landing gear compartment.

15. The aircraft according to claim 14, wherein the at least one further systems cabinet is in an area having a same pressure as a pressure external to an external surface of the aircraft during flight.

16. The aircraft according to claim 13, wherein the at least one of the systems cabinets in the immediate vicinity of the landing gear compartment is in an area having a same pressure as a pressure external to an external surface of the aircraft during flight.

\* \* \* \* \*